United States Patent [19]
Wei

[11] Patent Number: 5,442,626
[45] Date of Patent: Aug. 15, 1995

[54] DIGITAL COMMUNICATIONS SYSTEM WITH SYMBOL MULTIPLEXERS

[75] Inventor: Lee-Fang Wei, Lincroft, N.J.

[73] Assignee: AT&T Corp., Murray Hill, N.J.

[21] Appl. No.: 110,906

[22] Filed: Aug. 24, 1993

[51] Int. Cl.$^6$ ............................................. H04J 11/00
[52] U.S. Cl. ...................... 370/20; 329/304; 332/103; 371/37.4; 375/261; 375/252; 375/122; 375/240; 455/6.1; 348/384; 370/118
[58] Field of Search ............ 370/20, 38, 118; 329/304; 332/103; 341/173; 375/122, 36, 39, 12, 15; 455/4.1, 4.2, 6.1, 6.2, 49.1, 50.1, 53.1, 63; 348/384, 385, 426; 371/37.1, 37.4, 37.5

[56] References Cited

U.S. PATENT DOCUMENTS

| | | | |
|---|---|---|---|
| 4,656,629 | 4/1987 | Kondoh et al. | 455/4.1 |
| 4,852,090 | 7/1989 | Borth | 375/15 |
| 5,313,279 | 5/1994 | Wang et al. | 348/426 |
| 5,321,725 | 6/1994 | Park et al. | 375/39 |

OTHER PUBLICATIONS

Sklar B., *Digital Communications Fundamentals and Applications*, Englewood Cliffs, N.D., Prentice Hall, 1988, pp. 314–365, 407–409.

*Primary Examiner*—Douglas W. Olms
*Assistant Examiner*—Russell W. Blum
*Attorney, Agent, or Firm*—Gerard A. deBlasi

[57] ABSTRACT

A cost-effective, bandwidth-efficient, and power-efficient system is provided in which data streams received from several different video sources are converted into sequences of symbols selected from a predetermined constellation and are multiplexed on a symbol-by-symbol basis into a single sequence of symbols for transmission on a channel. Using a symbol multiplexer helps to mitigate the effect of bursty noise in the receiver and reduces the processing speed requirement in the receiver.

11 Claims, 8 Drawing Sheets

BIT PATTERN: $Z7_m\ Z6_m\ Z5_m\ Z4_m\ Z3_m\ Z2_m$

FIG. 5

| 4D SUBSET | $Y3_n$ $Y2_n$ $Y1_n$ $Y0_n$ | $Z1_n$ $Z0_n$ $Z1_{n+1}$ $Z0_{n+1}$ | 2D-SUBSET PAIR |
|---|---|---|---|
| 0 | 0 0 0 0 | 0 0 0 0 | (A,A) |
|   | 1 0 0 0 | 1 0 1 0 | (B,B) |
| 1 | 0 0 0 1 | 0 0 0 1 | (A,C) |
|   | 1 0 0 1 | 1 0 1 1 | (B,D) |
| 2 | 0 0 1 0 | 0 0 1 0 | (A,B) |
|   | 1 0 1 0 | 1 0 0 0 | (B,A) |
| 3 | 0 0 1 1 | 0 0 1 1 | (A,D) |
|   | 1 0 1 1 | 1 0 0 1 | (B,C) |
| 4 | 0 1 0 0 | 0 1 0 1 | (C,C) |
|   | 1 1 0 0 | 1 1 1 1 | (D,D) |
| 5 | 0 1 0 1 | 0 1 1 0 | (C,B) |
|   | 1 1 0 1 | 1 1 0 0 | (D,A) |
| 6 | 0 1 1 0 | 0 1 1 1 | (C,D) |
|   | 1 1 1 0 | 1 1 0 1 | (D,C) |
| 7 | 0 1 1 1 | 0 1 0 0 | (C,A) |
|   | 1 1 1 1 | 1 1 1 0 | (D,B) |

FIG. 9

| QAM CONSTELLATION SIZE | NUMBER OF INPUT BITS COLLECTED OVER TWO SIGNALING INTERVALS | MODIFICATIONS TO TRELLIS ENCODER 304 | |
|---|---|---|---|
| 256 | 15 | — | — |
| 192 | 14 | — | PRECODE $Ik_n, k=8,9,14,$ AND 15 |
| 128 | 13 | SET $Ik_n=0, k=9$ AND 15 | — |
| 96 | 12 | SET $Ik_n=0, k=9$ AND 15 | PRECODE $Ik_n, k=7,8,13,$ AND 14 |
| 64 | 11 | SET $Ik_n=0, k=8,9,14,$ AND 15 | — |
| 48 | 10 | SET $Ik_n=0, k=8,9,14,$ AND 15 | PRECODE $Ik_n, k=6,7,12,$ AND 13 |
| 32 | 9 | SET $Ik_n=0, k=7-9$ AND 13-15 | — |
| 24 | 8 | SET $Ik_n=0, k=7-9$ AND 13-15 | PRECODE $Ik_n, k=5,6,11,$ AND 12 |
| 16 | 7 | SET $Ik_n=0, k=6-9$ AND 12-15 | — |
| 12 | 6 | SET $Ik_n=0, k=6-9$ AND 12-15 | PRECODE $Ik_n, k=4,5,10,$ AND 11 |
| 4 | 3 | SET $Ik_n=0, k=4-15$ | — |

| $X3_n$ | $X2_n$ | $X1_n$ | $I15_n$ | $I14_n$ | $I9_n$ | $I8_n$ |
|---|---|---|---|---|---|---|
| 0 | 0 | 0 | 0 | 0 | 0 | 0 |
| 0 | 0 | 1 | 0 | 0 | 0 | 1 |
| 0 | 1 | 0 | 0 | 1 | 0 | 0 |
| 0 | 1 | 1 | 0 | 1 | 0 | 1 |
| 1 | 0 | 0 | 1 | 0 | 0 | 0 |
| 1 | 0 | 1 | 1 | 0 | 0 | 1 |
| 1 | 1 | 0 | 0 | 0 | 1 | 0 |
| 1 | 1 | 1 | 0 | 1 | 1 | 0 |

DIGITAL COMMUNICATIONS SYSTEM WITH SYMBOL MULTIPLEXERS

TECHNICAL FIELD

This invention relates to digital communications systems and, more particularly, to systems for transmitting digital signals over cable television networks.

BACKGROUND OF THE INVENTION

As information service providers offer more services through cable television, the demand for cable television bandwidth will greatly increase. Similarly, the introduction of high definition television (HDTV) channels, which require a significantly larger bandwidth than conventional television channels, will consume a large portion of the available cable television bandwidth. The number of cable television channels and bandwidth available, however, are limited.

Over-the-air and cable television channels are susceptible to both Gaussian and impulse noise. As a result, schemes for increasing the bandwidth efficiency of these channels must provide immunity to both Gaussian and impulse noise. Prior art systems which provide such noise immunity are complex and thus expensive, particularly where the data rate across a channel is high. However, consumer products, such as cable television reception equipment, must be reasonably priced if those products are to be widely successful in the marketplace.

SUMMARY OF THE INVENTION

A cost-effective, bandwidth-efficient, and power-efficient system is provided in which data streams received from several different video sources are converted into symbols of a predetermined constellation and are multiplexed on a symbol-by-symbol basis into a single sequence of symbols for transmission on a channel. The system includes a transmitter having a symbol multiplexer and a receiver which operates at a reduced processing speed to output symbols that correspond to data from a selected one of the different video sources. Multiplexing on a symbol-by-symbol basis mitigates the effect of bursty (impulse) noise on the channel.

BRIEF DESCRIPTION OF THE DRAWINGS

In the drawings:

FIG. 5 is a table for constructing and partitioning a four-dimensional constellation using the constellation of FIG. 4;

FIG. 9 is a table of modifications required for using the trellis encoder of FIG. 6 with constellations of various sizes;

DETAILED DESCRIPTION

Figure 1:
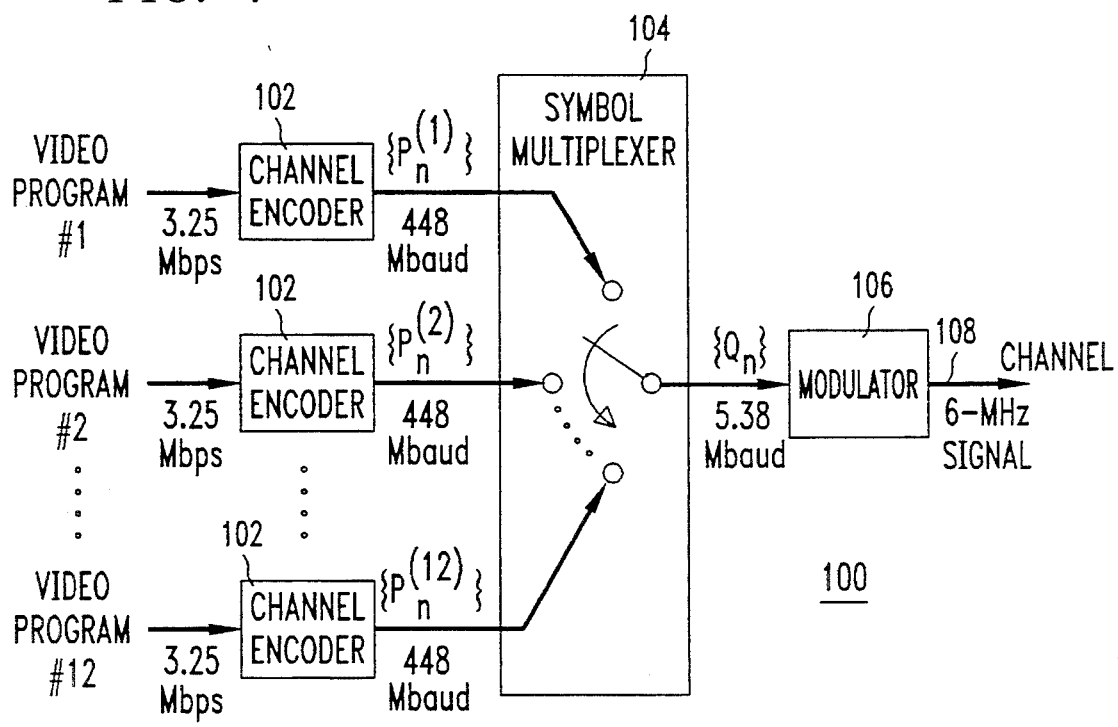
FIG. 1 is a block diagram of a transmitter constructed in accordance with the principles of the present invention.

FIG. 1 shows a block diagram of the transmitter 100 constructed in accordance with the principles of the invention. Transmitter 100 includes a plurality of channel encoders 102, a symbol multiplexer 104, and a modulator 106. A separate channel encoder 102 is used for each different video program to be transmitted on the same cable channel 108. In the exemplary embodiment shown in the figure, transmitter 100 includes twelve such channel encoders, each of which receives a different video program. Each channel encoder receives data at a nominal bit rate of 3.25 Mbps (the actual bit rate will be slightly lower as a result of overhead such as framing symbols to be added to the transmitted signal) and outputs to symbol multiplexer 104 a sequence of symbols $\{P_n^{(i)}\}$ at a nominal symbol rate of 448 Kbaud. The term "symbol" herein refers to a signal point of a two-dimensional (2D) QAM constellation.

Symbol multiplexer 104 multiplexes the twelve sequences of symbols received from the twelve channel encoders 102 into a single output sequence of symbols $\{Q_n\}$ at a symbol rate of 5.38 Mbaud. In accordance with the invention, symbol multiplexer 104 performs the multiplexing operation on a symbol-by-symbol basis. (While symbol multiplexer 104 is described herein for convenience as operating to multiplex symbols, it is to be understood that the multiplexer may actually multiplex the bit groups that correspond to the symbols from the various channel encoders on a bit group-by-bit group basis.) That is, the multiplexer takes one symbol from the sequence of symbols $\{P_n^{(1)}\}$ followed by a symbol from the sequence of symbols $\{P_n^{(2)}\}$, and so on through $\{P_n^{(12)}\}$, and then repeats the process again by taking a symbol from the sequence of symbols $\{P_n^{(1)}\}$. Symbol multiplexer 104 inserts the appropriate framing symbols required to distinguish between the symbols of the different input sequences. Framing is performed in a conventional manner. The multiplexed output sequence of symbols $\{Q_n\}$ is provided to modulator 106.

Figure 2:
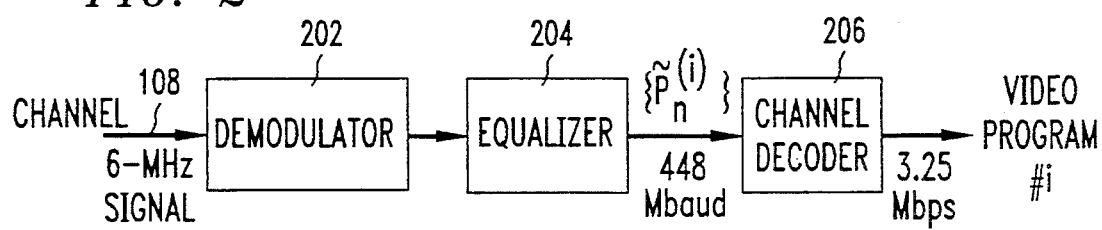
FIG. 2 is a block diagram of a receiver constructed in accordance with the principles of the present invention.

As further described below, multiplexing on a symbol-by-symbol basis in accordance with the invention mitigates the effect of bursty noise—which includes impulse noise—and greatly reduces the processing speed requirement in the receiver. Multiplexing on a symbol-by-symbol basis separates the symbols from a given video source i on channel 108 by eleven symbols (corresponding to the symbols from the other eleven video sources), thereby mitigating the effect of bursty noise in the receiver. The operation of symbol multiplexer 104 further enables receiver 200 to selectively operate on only one symbol in any given sequence of twelve symbols received from channel 108 to recover data bits from a given video program i. Thus, the receiver can operate at a fraction of the rate at which symbols are transmitted across channel 108 (also referred to herein as the "signaling rate"). In the embodiment of FIGS. 1 and 2, receiver 200 operates at 1/12 of the signaling rate. This advantageously reduces the complexity of the receiver.

Modulator 106 modulates the output sequence of symbols into a 6 MHz signal. It is to be understood that modulator 106 includes conventional pulse shaping filters and other conventional elements required to generate an output signal. The output of modulator 106 is transmitted on a single 6 MHz cable channel. In a typical application, a separate transmitter/modulator is provided for each 6 MHz cable channel, with each transmitter multiplexing several (e.g., twelve) video programs onto its respective cable channel. Alternatively, modulator 106 can be configured to perform subcarrier modulation by modulating the sequence of symbols $\{Q_n\}$ received from symbol multiplexer 104 to a convenient intermediate frequency that can be combined with other intermediate frequencies in a conventional manner for transmission over a common carrier frequency.

FIG. 2 shows a receiver 200 for receiving a single video program i from a 6 MHz signal that has been received on cable channel 108. Receiver 200 includes a demodulator 202, an equalizer 204, and a channel decoder 206. Demodulator 202 demodulates the received 6 MHz signal and performs the necessary filtering and A/D converting operations to produce a sequence of complex samples at a sampling rate of 10.76 MHz. Equalizer 204, as described in greater detail below, receives the samples from demodulator 202 and outputs a sequence of equalized symbols $\{P_n^{(i)}\}$ at a rate of 448 Kbaud. The output sequence of symbols from equalizer 204 corresponds to one of the twelve video programs that were multiplexed by symbol multiplexer 104 into the 6 MHz cable signal. Equalizer 204 determines from the framing symbols which accompany the data symbols which of the symbols output from demodulator 202 are to be equalized. Channel decoder 206 (described below) decodes the sequence of symbols received from equalizer 204 to output a stream of data bits corresponding to the selected video program i.

Figure 3:
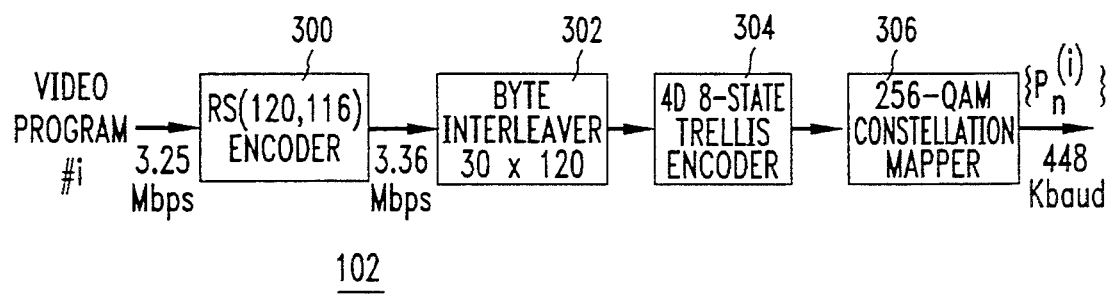
FIG. 3 is a block diagram of an illustrative embodiment of the channel encoder of FIG. 1.

Returning again to the description of transmitter 100, FIG. 3 shows an exemplary embodiment of channel encoder 102. Channel encoder 102 includes a Reed-Solomon (RS) encoder 300, a byte interleaver 302, a trellis encoder 304, and a constellation mapper 306. RS encoder 300 and trellis encoder 304 respectively are the outer and inner codes which form a concatenated code. Byte interleaver 302 (and its corresponding deinterleaver in the receiver) further enhances the receiver capability to handle bursty noise that may come from the channel and the front end of the receiver. Although the invention is described herein in the context of a concatenated code, it is to be understood that other codes, such as a trellis or RS code alone, could be used without departing from the scope of the invention.

I have realized that an important criterion in designing a code for use in transmitting data across a cable television channel is to obtain maximum Gaussian noise immunity while providing some protection against impulse noise. I have discovered that a concatenated code, comprising a multidimensional trellis code (i.e., a 2N-dimensional trellis code where N is an integer greater than one) as the inner code together with a RS code as the outer code, where the amount of redundancy introduced by the Reed-Solomon encoder is no more than 0.375 bits per symbol of the constellation, provides superior performance over prior coding schemes. In a preferred embodiment, the amount of redundancy introduced by the outer Reed-Solomon code does not exceed that introduced by the inner trellis coded modulation. However, where the dimensionality of the trellis code makes it desirable to have an RS code that generates more redundancy bits than the trellis encoder, the RS code preferably introduces at most an average of 0.375 redundancy bits per symbol of the constellation. In a more preferred embodiment, the trellis code is a 4-dimensional (4D) code, and the RS code is at most a triple error-correcting RS code. That is, the RS code corrects no more than three RS symbol errors per RS codeword. I have found that double error-correcting and triple error-correcting RS codes provide the best performance. I have realized that using an RS code that is more than triple error-correcting as the outer code causes a reduction in bandwidth and power efficiency which cancels any gain that may be achieved by using a more powerful RS code.

Although the concatenated code has been described above in the context of an RS code which corrects a predetermined number of errors, those skilled in the art will appreciate that the RS code alternatively could correct two erasures in place of each error the code could correct. For example, a double error-correcting RS code is capable of correcting two errors, one error and two erasures, or four erasures.

RS encoder 300 illustratively is a RS(120,116) over a finite field $GF(2^8)$ capable of correcting two RS symbol errors. Each RS symbol here consists of eight bits. RS encoder 300 receives data for a selected video program i at a nominal rate of 3.25 Mbps and outputs data at 3.36 Mbps to byte interleaver 302. The RS encoder receives a frame of 116 RS symbols and outputs a frame of 120 RS symbols, including the received 116 RS symbols plus four redundancy RS symbols. Each frame of 120 RS symbols is referred to as a "RS codeword." Byte interleaver 302 interleaves the RS symbols output from RS encoder 300. Byte interleaver 302 includes a buffer (not shown) having 30 rows by 120 columns of RS symbols. RS symbols output from RS encoder 300 are read into the buffer on a row-by-row basis and are read from the buffer on a column-by-column basis. Byte interleaver then converts the sequence of RS symbols read from the buffer into a stream of bits, which are output to trellis encoder 304.

Figure 4:
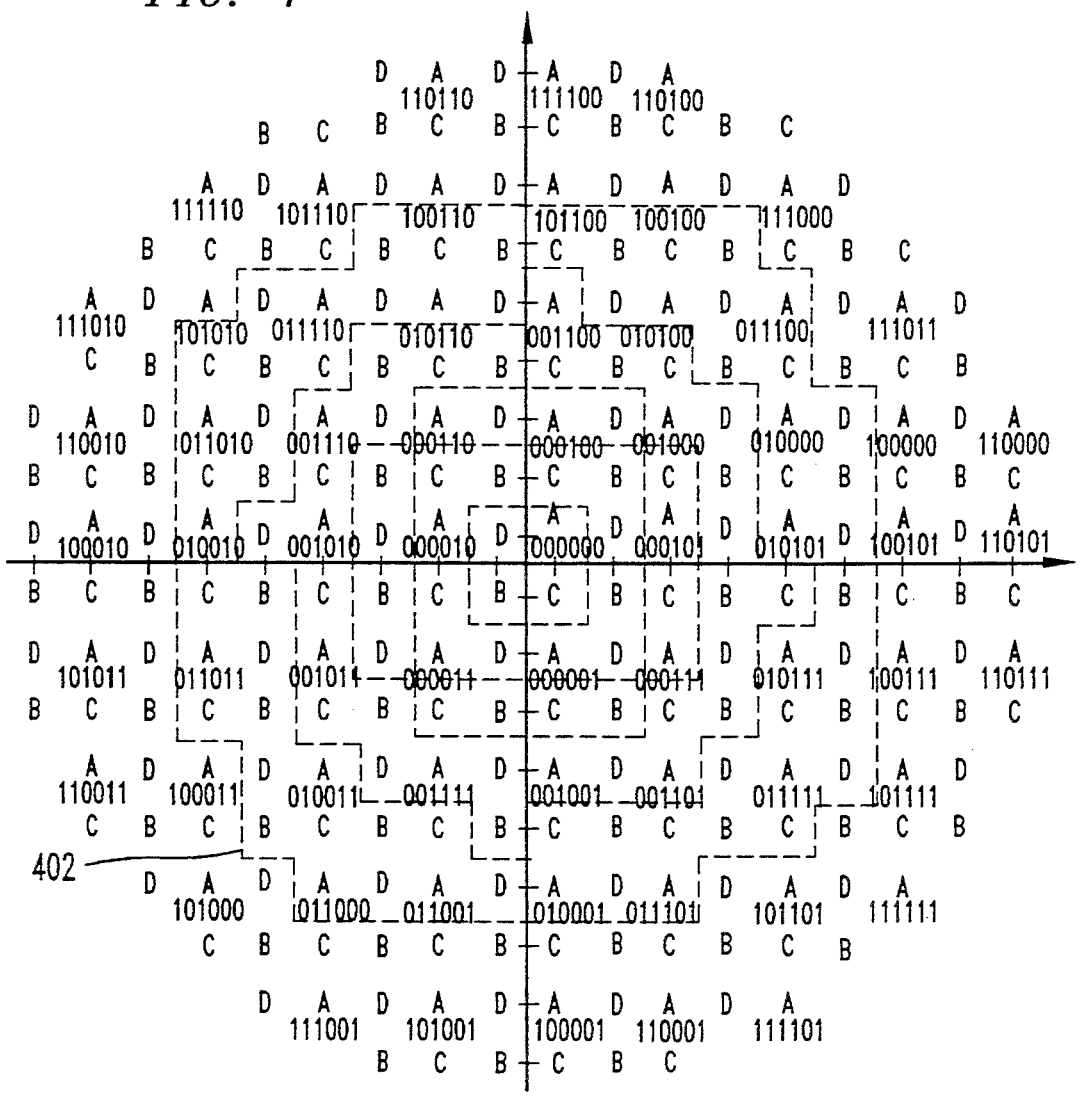
FIG. 4 is an illustrative two-dimensional constellation suitable for use with the transmitter of FIG. 1.

Trellis encoder 304 illustratively is a 4D 8-state trellis encoder which encodes the bits from byte interleaver 302 and outputs the trellis encoded bits to constellation mapper 306 to select a symbol from the constellation shown in FIG. 4.

FIG. 4 shows a 2D 256-QAM constellation. As used herein, a QAM constellation is a multiple amplitude, multiple phase constellation which need not be a square constellation. The constellation preferably is chosen to have a circular shape to reduce the peak and average powers of the transmitted signal. The constellation has 90 degree phase symmetries. That is, the constellation is invariant to 90, 180, and 270 degree phase rotations. The constellation is partitioned into four 2D subsets, A, B, C, and D. A $2^{16}$-point 4D constellation is then formed by concatenating a pair of 2D 256-QAM constellations. The 4D constellation is partitioned into eight 4D subsets 0 through 7. Each 4D subset consists of two pairs of 2D subsets as shown in FIG. 5. For example, 4D subset 0 consists of 2D-subset-pairs (A,A) and (B,B).

Figure 6:
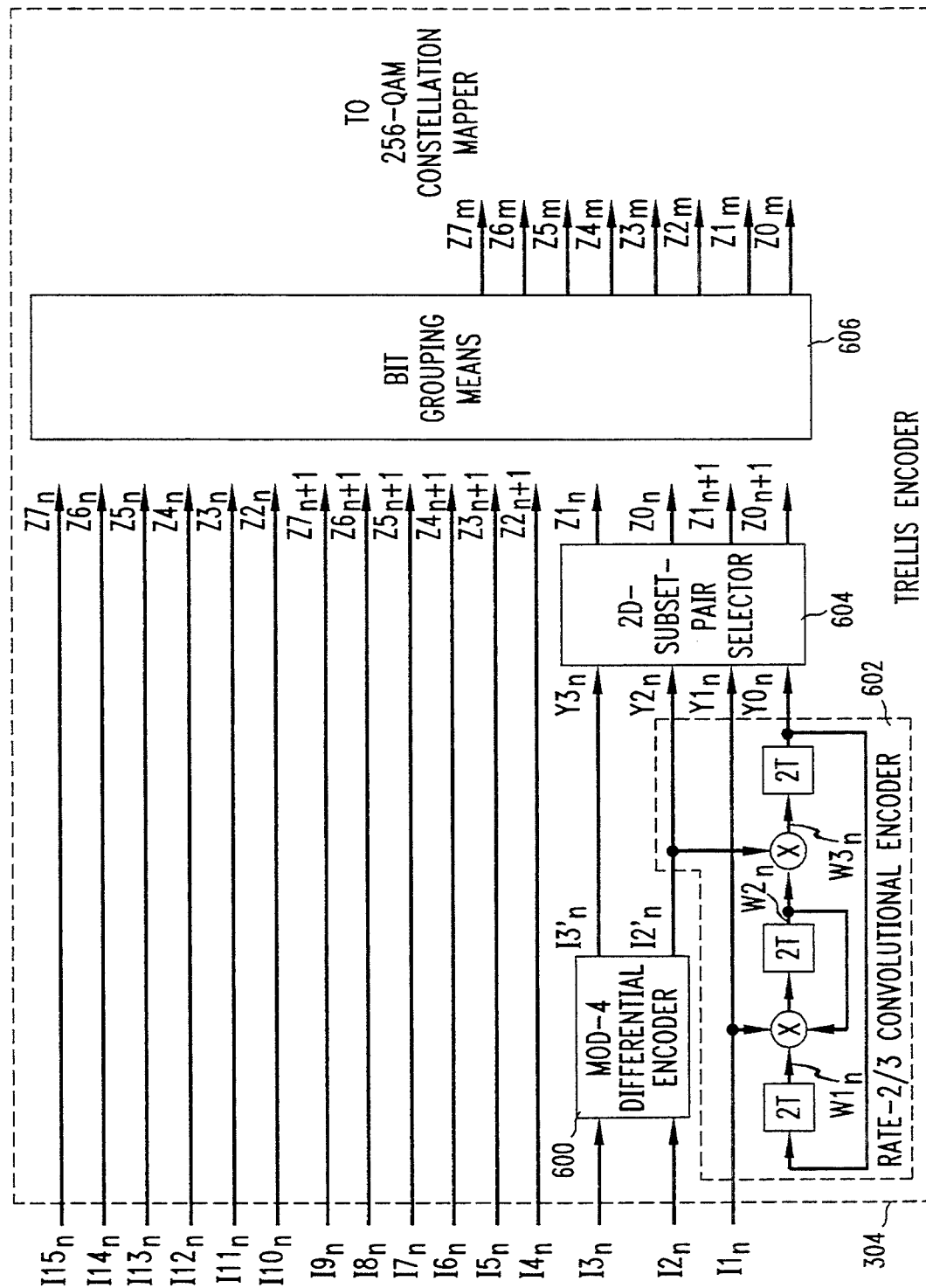
FIG. 6 is a block diagram of the trellis encoder of the channel encoder of FIG. 3.

FIG. 6 shows trellis encoder 304 of FIG. 3 in greater detail. Trellis encoder 304 includes a mod-4 differential encoder 600, a rate-$\frac{2}{3}$ convolutional encoder 602, a 2D subset-pair selector 604, and a bit grouping means 606. Trellis encoder 304 receives fifteen input bits, $I1_n$ through $I15_n$, collected over two signaling intervals, n and n+1. Two of the input bits, $I3_n$ and $I2_n$ are differentially encoded by differential encoder 600 to provide immunity to 90-, 180-, and 270-degree phase rotations of the constellation. Differential encoder 600 illustratively is a mod-4 adder whose present output bit pair $I3_n'I2_n'$ is the mod-4 sum of the previous input pair $I3_{n-2}'I2_{n-2}'$ and the present input bit pair $I3_nI2_n$.

One differentially-encoded bit, $I2_n'$, together with another input bit, $I1_n$, enters convolutional encoder 602, which generates three output bits, $Y2_n$, $Y1_n$, and $Y0_n$. Conceptually, these three bits are first used to select a 4D subset $Y2_nY1_nY0_n$ from the 4D constellation. The other differentially-encoded bit, $I3_n'$ (which is re-named as $Y3_n$), is next used to select a 2D-subset-pair from the selected 4D subset. The remaining twelve uncoded input bits ($I4_n$ through $I15_n$) are then divided into two groups. Each group is used to select a symbol from a 2D subset of the selected 2D-subset-pair.

In actual implementation, the above three-step selection process is done as follows. Referring to FIG. 6, the four bits output from the differential and convolutional encoders, $Y3_n$, $Y2_n$, $Y1_n$, and $Y0_n$, are first converted by 2D-subset-pair selector 604 into another four bits $Z1_n$, $Z0_n$, $Z1_{n+1}$, and $Z0_{n+1}$. The table of FIG. 5 shows the detail of this conversion. Bit grouping means 606 divides the four converted bits and the remaining twelve uncoded input bits into two groups, $\{Z7_m, Z6_m, \ldots, Z0_m\}$ for m=n and n+1. In particular, bits $I10_n$ through $I15_n$ are renamed as $Z2_n$ through $Z7_n$, respectively, and bits $I4_n$ through $I9_n$ are renamed as $Z2_{n+1}$ through $Z7_{n+1}$, respectively. Each group is used by constellation mapper 306 (of FIG. 3) to select a symbol $P_m$ from the 2D 256-QAM constellation. (This group of bits is the bit group mentioned above with respect to symbol multiplexer 104.) The selection can be performed according to the bit mapping shown in FIG. 4. To simplify the drawing, FIG. 4 shows only the mapping from $Z7_mZ6_m\ldots Z2_m$ to symbols in subset A. To perform the selection, the following rules are applied: (1) the bit patterns of $Z1_mZ0_m$ that correspond to subsets A, B, C, and D are 00, 10, 01, and 11, respectively; and (2) any four symbols that can be obtained from each other through a 90-, 180-, or 270-degree phase rotation are assigned with the same bit pattern of $Z7_mZ6_m\ldots Z2_m$.

In the above described embodiment, the 4D trellis encoder generates an average of 0.5 redundant bits per symbol of the constellation. The RS(120,116) encoder generates an average of 0.25 redundant bits per symbol of the constellation.

One skilled in the art will appreciate that various modifications can be made to transmitter 100 without departing from the scope of the invention. For example, channel encoders 102 of FIG. 1 have been described as each including a constellation mapper 306 dedicated to mapping encoded data bits generated by the respective channel encoder (see FIG. 3). However, a single constellation mapper could be shared by the twelve channel encoders 102. The single constellation mapper would be disposed at the output of the symbol multiplexer, and the symbol multiplexer would multiplex the bit groups corresponding to symbols from the different video sources, as discussed above.

Having described transmitter 100, the details of receiver 200 will now be described. In particular, the details of equalizer 204 and channel decoder 206 are described below.

Equalizer 204 equalizes the channel distorted signal samples output from demodulator 202 (FIG. 2) to produce a sequence of equalized symbols $\{P_n^{(i)}\}$. Equalizer 204 receives samples from demodulator 202 at or above the symbol rate of 5.38 Mbaud, but performs the equalizing operation at a fraction of the symbol rate. This reduced speed operation greatly simplifies the complexity of equalizer 204. Because the equalizer outputs only symbols generated by one of channel encoders 102 (in this instance, one of twelve channel encoders), the effect of bursty noise from the channel is mitigated.

Figure 7:
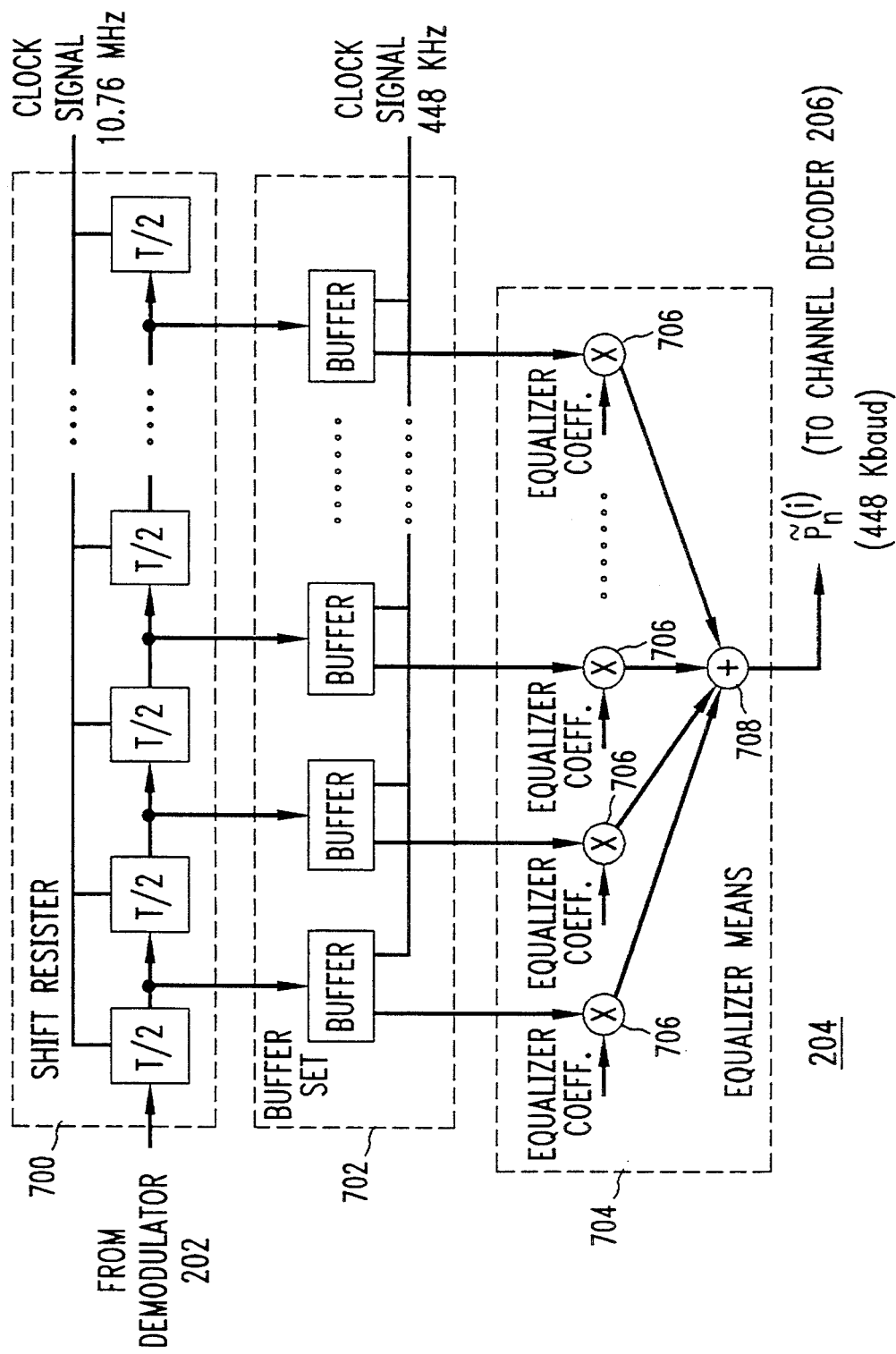
FIG. 7 is a schematic diagram of the equalizer of FIG. 2.

FIG. 7 shows an exemplary embodiment of equalizer 204. Equalizer 204 includes a shift register 700 having several storage elements connected in series and being clocked at a first clock rate, and a buffer set 702 which is clocked at a second, slower clock rate. Each of the buffers (or registers) in buffer set 702 is coupled to the output of a respective storage element of shift register 700. The signal samples stored in buffer set 702 are output to a conventional equalizer means 704. Equalizer means 704 includes multipliers 706 and an adder 708 which operate to apply equalizer coefficients to the signal samples received from the buffer set 702 to produce an equalized symbol $P_n^{(i)}$ at the second clock rate. One skilled in the art will appreciate that equalizer means 704 may include conventional circuitry (not shown) for updating the equalizer coefficients according to channel conditions (i.e., equalizer means 704 is an adaptive equalizer).

In the embodiment of FIG. 7, the storage elements of shift register 700 are spaced by T/2 seconds, where T is the signaling interval (1/5.38 μsec). Shift register 700 receives from demodulator 202 complex samples at 10.76 MHz, which corresponds to twice the symbol rate of the transmitter (2×5.38 Mbaud). Buffer set 702 is clocked at a rate of 448 KHz to generate an output sequence of equalized symbols $\{P_n^{(i)}\}$ at 448 Kbaud. The clock rate of shift register 700 is an integral multiple of the clock rate of buffer set 202. In this example, the dock rate of shift register 700 is 24 times the clock rate of buffer set 202.

If a second video program j that is carried by the same 6 MHz cable channel is to be received simultaneously with the first video program i, (for example, to permit two television programs to be watched simultaneously on a single screen), a second buffer set (not shown) can be coupled to shift register 700 in parallel with buffer set 702. The second buffer set has the same structure and operates in the same manner as buffer set 702 to receive samples from shift register 700. The second buffer set also is clocked at 448 KHz, but with a different clock phase. The signal samples stored in the second buffer set are then equalized, with the same equalizer coefficients and equalizer circuitry that are used to equalize the samples from buffer set 702, to generate a second output sequence of equalized symbols $\{P_n^{(j)}\}$.

Figure 8:
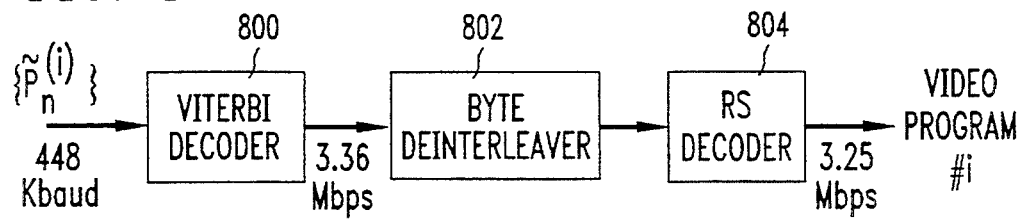
FIG. 8 is a block diagram of the channel decoder of FIG. 2.

FIG. 8 shows channel decoder 206 in greater detail. Channel decoder 206 performs the inverse operation of channel encoder 102. In particular, the sequence of equalized symbols $\{P_n^{(i)}\}$ received from equalizer 204 is first processed by a conventional Viterbi decoder 800. Viterbi decoder 800 outputs a stream of bits to a byte deinterleaver 802 which outputs RS symbols to an RS decoder 804. RS decoder 804 outputs a stream of data bits corresponding to the decoded video program i.

An important design criterion for a good digital communication system is that the system can be modified easily to transmit different data rates for different channel conditions. The modem described herein allows transmission at different data rates by changing the size of the constellation of FIG. 4. FIG. 9 shows the modifications that are required to trellis encoder 304 of FIG. 6 to use the same concatenated coding structure for constellations of different sizes.

FIG. 9 shows a table identifying constellations of different sizes and the number of input bits collected by the trellis encoder over two signaling intervals, and the modifications required to vary the constellation size (and hence the data rate). For those constellations whose size is a power of two, the modifications required are simply to set some of the input bits in FIG. 6 to zero. For example, when bits $I9_n$ and $I15_n$ are set to zero, the same coding structure shown in FIGS. 4–6 will produce a sequence of symbols from a 128-QAM constellation. This 128-QAM constellation is indicated on FIG. 4 by reference number 402.

Figures 10, 11:
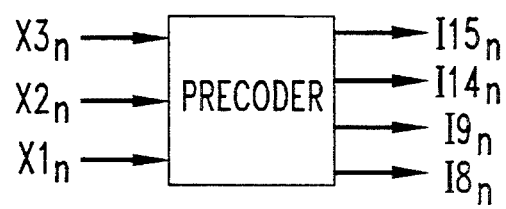
FIG. 10 is a block diagram of the precoder referred to in FIG. 9 showing the bits input to and output from the precoder.
FIG. 11 is a table showing the input and output values for implementing the precoder of FIG. 10.

For those constellations shown in FIG. 9 whose size is not a power of two, the modifications required precoding selected bits and possibly setting other selected bits to zero. The precoder, which receives three input bits from byte interleaver 302 and outputs four bits to trellis encoder 304, is shown in FIGS. 10 and 11. For example, when bits $I9_n$ and $I15_n$ are set to zero and bits $I7_n$, $I8_n$, $I13_n$, and $I14_n$ are precoded, the coding structure shown in FIGS. 4–6 will produce a sequence of symbols from a 96-QAM constellation.

One skilled in the art will appreciate that other modifications can be made to the disclosed embodiments without departing from the scope of the invention. For example, changes to the size of the QAM constellation can be made together with changes in the parameters of the byte interleaver and the RS code if desirable, but the byte interleaver and RS code parameters need not be changed. For example, in the case of a 128-QAM constellation, the RS code could be changed to RS(104,100) and the byte interleaver modified to include a buffer having 26 rows and 104 columns. However, a 128-QAM constellation will work with a RS(120,116) and a byte interleaver buffer of 30 rows and 120 columns. Moreover, constellation sizes other than those shown on FIG. 9 could be used, provided the appropriate changes are made to the constellation mapper.

Although the coding schemes have been described in the context of cable television applications, one skilled in the art will appreciate that these coding schemes are equally applicable to over-the-air HDTV broadcasting and digital subscriber loop applications. Over-the-air HDTV applications may use a Reed-Solomon code which corrects a greater number of errors but which still adds no more than 0.375 redundancy bits per symbol of the constellation.

Although QAM constellations are described herein, the principles of the invention also can be used with vestigial sideband (VSB) modulation. For VSB, the two coordinates of a symbol are transmitted in two separate signaling intervals. Symbol multiplexer 104 operates as a coordinate multiplexer which multiplexes the coordinates of the symbols in the sequence on a coordinate-by-coordinate basis.

I claim:

1. A transmitter comprising:
   means for generating a sequence of bit groups for each of a plurality of sources, each bit group representing to a symbol of a predetermined constellation;
   means for multiplexing the plurality of sequences of bit groups output by the plurality of sources into a single sequence of bit groups, where the multiplexing is performed on a bit group-by-bit group basis; and
   means for generating a transmitted signal that represents said single sequence of bit groups.

2. The invention of claim 1 wherein the predetermined constellation is a QAM constellation.

3. The invention of claim 1 wherein the sequence generating means comprises:
   means for receiving a stream of input bits from each of the plurality of sources; and
   means for encoding each received stream of input bits with an error-correcting code.

4. The invention of claim 3 wherein the error-correcting code is selected from the group of error-correcting codes consisting of: Reed-Solomon codes, trellis coded modulation, and concatenated Reed-Solomon code and trellis coded modulation.

5. Apparatus for transmitting a signal over a cable television channel, the apparatus comprising:
   means for generating a sequence of bit groups for each of a plurality of sources, each bit group representing to a symbol of a predetermined QAM constellation;
   means for multiplexing the plurality of sequences of bit groups into a single sequence of bit groups, where the multiplexing is performed on a bit group-by-bit group basis; and
   means for generating a signal that represents said single sequence of bit groups for transmission over the cable television channel.

6. The invention of claim 5 wherein the sequence generating means comprises:
   means for receiving a stream of input bits from each of the plurality of sources; and
   means for encoding each received stream of input bits with an error-correcting code.

7. The invention of claim 6 wherein the error-correcting code is selected from the group of error-correcting codes consisting of: Reed-Solomon codes, trellis coded modulation, and concatenated Reed-Solomon code and trellis coded modulation.

8. A transmitter comprising:
   means for generating a sequence of symbols for each of a plurality of sources, each symbol in the sequences of symbols being a symbol of a predetermined constellation;
   means for multiplexing the plurality of sequences of symbols into a single sequence of symbols, where the multiplexing is performed on a symbol-by-symbol basis; and
   means for generating a transmitted signal that represents said single sequence of symbols.

9. Apparatus for receiving from a channel a signal that was generated by processing a plurality of streams of input bits to produce respective sequences of bit groups and multiplexing the plurality of sequences of bit groups into a single sequence of bit groups, the multiplexing being performed on a bit group-by-bit group basis, and by thereafter providing, in said generated signal, a symbol selected from a predetermined constellation in response to each bit group in the single sequence of bit groups, said receiver apparatus comprising:
   a demodulator and
   means for recovering from said received signal a selected one of the plurality of streams of input bits, connected to said demodulator.

10. The invention of claim 9 wherein the recovering means comprises an equalizer means which receives signal samples at a rate which is at least the same as the rate at which symbols are transmitted over the channel, the equalizer means being capable of generating a sequence of equalized symbols at a rate which is lower than the symbol rate.

11. The invention of claim 9 wherein the received signal was generated by encoding with an error-correcting code, and wherein the recovering means further comprises means for decoding the received signal to recover a selected one of the plurality of streams of input bits.

* * * * *